Aug. 15, 1939.   G. O. MATTER   2,169,266
GAME
Filed Nov. 1, 1937   2 Sheets-Sheet 1
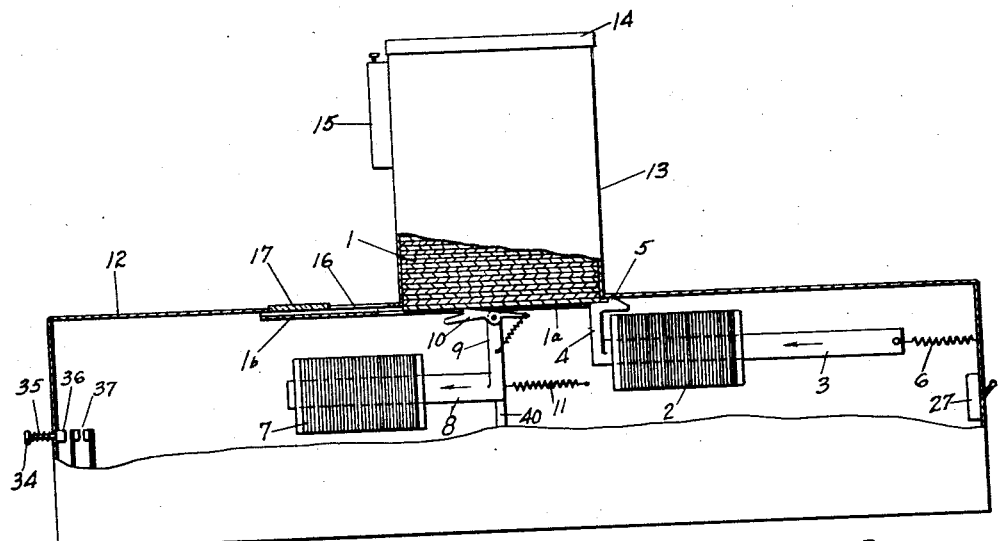
Fig. I
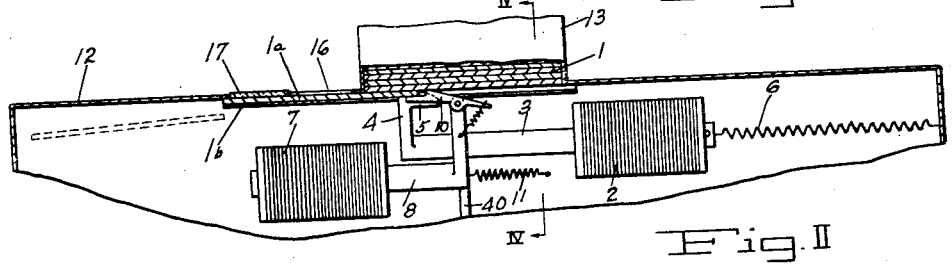
Fig. II
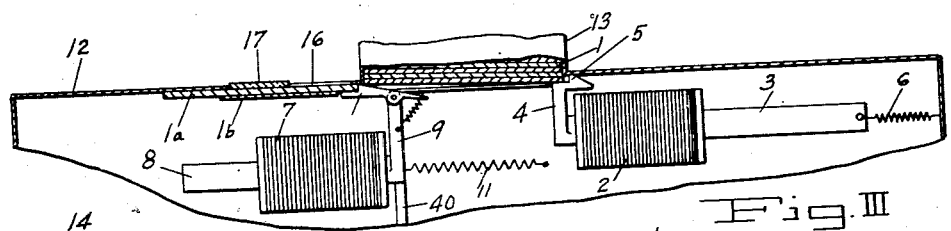
Fig. III
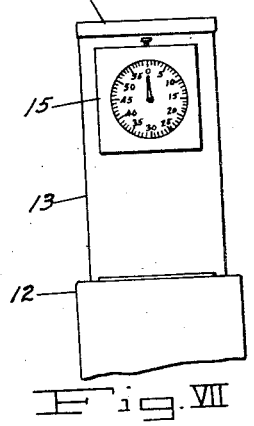
Fig. VII
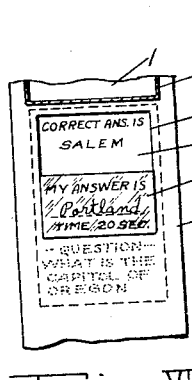
Fig. VI   Fig. V
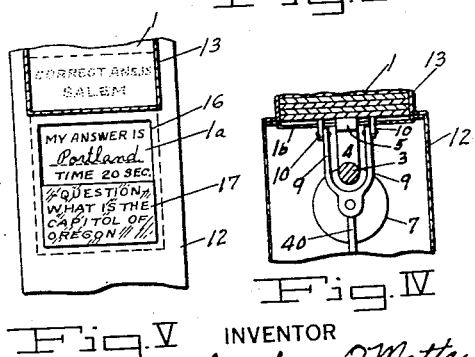
Fig. IV
INVENTOR
Gustave O. Matter.

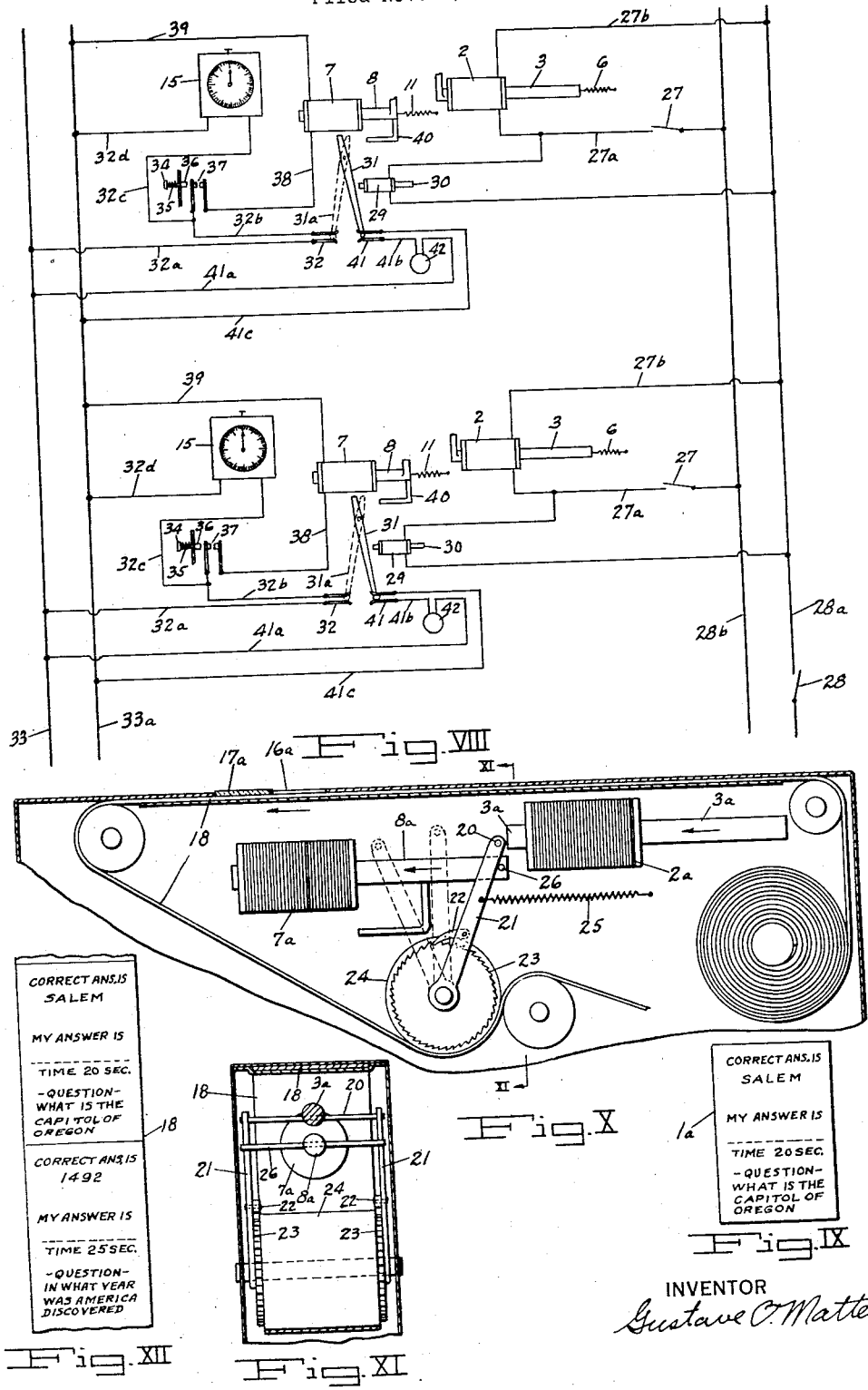

Patented Aug. 15, 1939

2,169,266

UNITED STATES PATENT OFFICE 2,169,266

GAME

Gustave O. Matter, Portland, Oreg.

Application November 1, 1937, Serial No. 172,087

3 Claims. (Cl. 35—9)

My invention relates in general to amusement devices and in particular to games of knowledge wherein a problem is indicated for solution and the correct solution is also indicated and arranged so as to remove all doubt as to the correct solution and the time required to solve the problem.

An object of this invention is to provide means whereby the problem to be solved is exposed to view with a space provided to indicate therein a supposed solution of the problem and to provide means whereby, after a period of time, the problem indicated is removed from view and the supposed solution and the correct solution are exposed to view.

Another object is to provide means for recording the time consumed in solution of the problem.

Another object, when several players of the game are in competition with one another, is to provide means for indicating when a player has completed the solution.

Another object is to provide a means for stopping the time recording device and exposing the correct solution to the problem when the player has completed a supposed solution.

The foregoing objects will be amplified and other objects will appear in and from the following specification considered in connection with the accompanying drawings, which are for purposes of illustration and not intended as a defination of the invention, the invention being defined in the appended claims.

Referring to the drawings, in which like characters of reference indicate corresponding parts throughout the several views:

Fig. I is a side elevation, partly in section, of an embodiment of my invention, showing the operating mechanism in normal position.

Fig. II is a view similar to Fig. I, showing the mechanism and a problem card positioned so the problem and the space for the supposed solution are exposed to view.

Fig. III is a view similar to Fig. II except that the mechanism and problem card are positioned so that the problem is removed from view and the supposed solution and the correct solution are exposed to view.

Fig. IV is a section on line IV—IV of Fig. II.

Fig. V is a top plan view of a portion of Fig. II showing the problem card in the position shown in that figure.

Fig. VI is a top plan view of a portion of Fig. III showing the problem card in the position shown in that figure.

Fig. VII is a left hand elevation of a portion of Fig. I.

Fig. VIII is a schematic diagram of the electric circuits involved.

Fig. IX is a plan view of a form of problem card.

Fig. X is a sectional elevation of a modified form of my invention.

Fig. XI is a section on line XI—XI of Fig. X.

Fig. XII is a plan view of a portion of the problem tape shown in Fig. X.

Referring to the drawings, I indicates a pile of problem cards, of the general type shown in Fig. IX, each with a different problem thereon.

By energizing the solenoid 2 which causes the armature 3 with arm 4 and hook 5 to move in the direction of the arrow, the hook 5 contacts the bottom card 1a which is moved, in the guide 1b, from under the pile 1 to the position shown in Figs. II and V.

The armature 3 is returned to its normal position by spring 6 when solenoid 2 is de-energized.

When the solenoid 7 is energized the armature 8, with its arms 9 and pawls 10, moves in the direction of the arrow, the pawls 10 contacting the card 1a, when in the position shown in Figs. II and V, move the card to the position shown in Figs. III and VI.

The armature 8 is returned to its normal position by spring 11 when solenoid 7 is de-energized.

A case 12 surrounds the operating mechanism and the problem cards 1 are held in alinement by the casing 13 which has a cover 14.

Any suitable electrically operated time recording device 15 is provided.

An opening 16 in the top of case 12 permits the player to write an answer to the problem on the card 1a when it is in the position shown in Figs. II and V, at which time the question on the card is viewed through the transparent plate 17 and the correct answer to the problem is obstructed from view.

When the card 1a is in the position shown in Figs. III and VI the correct answer is viewed through the opening 16 and the answer written on the card by the player is viewed through the transparent plate 17 and the problem is obstructed from view.

The purpose of the plate 17 is to eliminate any tendency to alter the player's supposed answer after the correct answer is brought to view and at the same time to permit checking of the player's answer with the correct answer.

The problems on the several cards being of a different nature, the average time for solution of a problem would vary, therefore, especially if only one player is playing the game, a time limit is indicated in connection with each problem as shown in Figs. V, VI, IX and XII, and if the player solves the problem within the indicated time he is assumed to have won the game.

In the modified form shown in Figs. X, XI and XII a tape 18 is used instead of the cards 1, the tape 18 having indicated on one face thereof, problems, spaces for the player's solution and the correct answer, similar to the cards 1 and arranged in consecutive order on the tape as shown in Fig. XII.

The solenoid 2a, when energized, moves the armature 3a in the direction of the arrow and thereby the rod 20 attached to arms 21 which carry pawls 22 operate toothed wheel 23 and friction wheel 24 which moves tape 18 into a position equal to that shown in Fig. V, the solenoid 2a is de-energized and the spring 25 returns the arms 21, pawls 22 and rod 20 to their normal position and when the solenoid 7a is energized the armature 8a, with the aid of the bar 26, moves the arms 21 in the direction of the arrow thereby moving the tape 18 into a position equal to that shown in Fig. VI.

When several players are playing the game in competition with one another the operation is as follows:

The attendant closes the switch 27 for each game that is intended to be played and when all players are ready to start solving their problem the attendant closes switch 28 on main circuit wires 28a and 28b and keeps it closed only long enough to supply electric energy to all of the games which have their respective switches 27 closed, the solenoid 2 is energized through wires 27a and 27b and thereby the lower problem card 1a, of each of the piles of cards 1, is moved into a position which places the problem under the transparent plate 17 and the space provided on the card for the player to write an answer to the problem is within the opening 16 which exposes to view, both the problem and the player's written answer while the correct answer is obstructed from view.

When the solenoid 2 is energized the solenoid 29 is also energized and the armature 30 moves the switch arm 31 into the position shown in dotted outline as 31a, closing switch 32, thus forming a circuit on main circuit wires 33 and 33a through wires 32a, 32b and 32c, time recording device 15 and wire 32d and the time is being recorded while the problem is being solved.

As soon as a player has written a solution to the problem, in the space provided therefore, the player presses the switch button 34 against the spring 35 and the switch button stem 36 closes spring switch 37 and a circuit is made from wire 33, through wire 32a, switch 32, wire 32b, switch 37, wire 38, solenoid 7, and wire 39 to wire 33a thus energizing solenoid 7 which moves armature 8 and thereby the problem card 1a is moved into a position which places the player's written answer, to the problem, under the transparent plate 17 and the correct answer within the opening 16 exposing to view, both the player's answer and the correct answer while the problem is obstructed from view.

At this same time the arm 40 attached to armature 8 moves the switch arm 31 into the position shown in full lines thereby opening switch 32 and closing switch 41 which forms a circuit from wire 33 through wire 41a, light 42, switch 41 and wire 41c to wire 33a. A light 42 connected to each device can be placed in any location conveniently observed by the attendant and indicates that the respective player has completed the solution of the problem.

At the time the switch 32 is opened the circuit to the time recording device 15 is broken thus stopping its operation and indicating the time required to solve the problem and also the circuit to the solenoid 7 is broken and the armature 8 with its attached parts is returned to its normal position by the spring 11.

All parts are now inoperative, except the light 42, and remain so until the attendant again closes the switch 28 at the start of another game.

The problems in the several devices vary and it is possible that each player in the same game may have a different problem to solve and in that case there is no particular advantage in a player observing the answer of any of the other players.

The player who solves the problem correctly in the shortest period of time is to be considered the winner of the game, in which case the time indicated on each problem card is disregarded.

If the various problems vary considerably as to the time required in their solution then the cycle of operation would be the same as just stated but the player who correctly solves the problem in the shortest period of time in proportion to the time indicated on the problem card will be considered the winner.

If only one player is playing the game in competition with time then the operation is the same as when several players are playing but the player can be considered to have won the game by solving the problem correctly within the time indicated on the problem card.

From the foregoing it will be understood that all of the objects of this invention have been accomplished, although I have herewith illustrated an electrical control for causing the operation of the mechanism, any desirable form of control may be utilized without in the least departing from the spirit of my invention as defined by the appended claims.

What I claim is:

1. In a machine of the class described, a container, a plurality of cards in said container that substantially fit the inner cross-section thereof and solenoid operated hooks that are effective to partially remove one card from the bottom of those in the container and expose it partially to view and another solenoid operated means that is effective to move the card to cover a part thereof theretofore exposed and to uncover the part that was concealed by the first operation.

2. In a machine of the class described, a box member, cards bearing indicia in said box member, a body upon which said box member is mounted, said body being provided with an opening adjacent the box and transparencies adjacent the opening, with hook means positioned to be effective to move a card from the bottom of the box, expose a part of it under the opening and another part under the transparency and another hook means for further moving the card selectively, to expose a part theretofore hidden and to move the part theretofore under the opening to a position beneath the transparency.

3. In a machine of the class described, a boxlike container that opens downwardly, indicia bearing cards that are stacked in said container a base member upon which said container is mounted, mechanism that is effective to partially move one card from the bottom of those in the container and partially expose it to view and another mechanism effective to move the card to uncover a part thereof theretofore concealed.

GUSTAVE O. MATTER.